April 18, 1961    O. A. WANDEL ET AL    2,979,725
FASTENER DRIVING APPARATUS
Filed Sept. 10, 1957    5 Sheets-Sheet 3
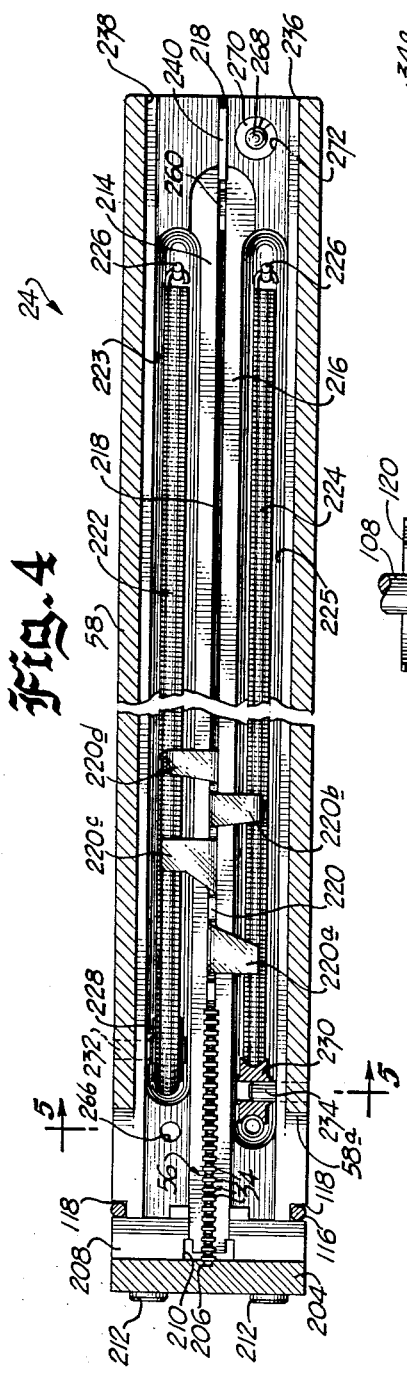
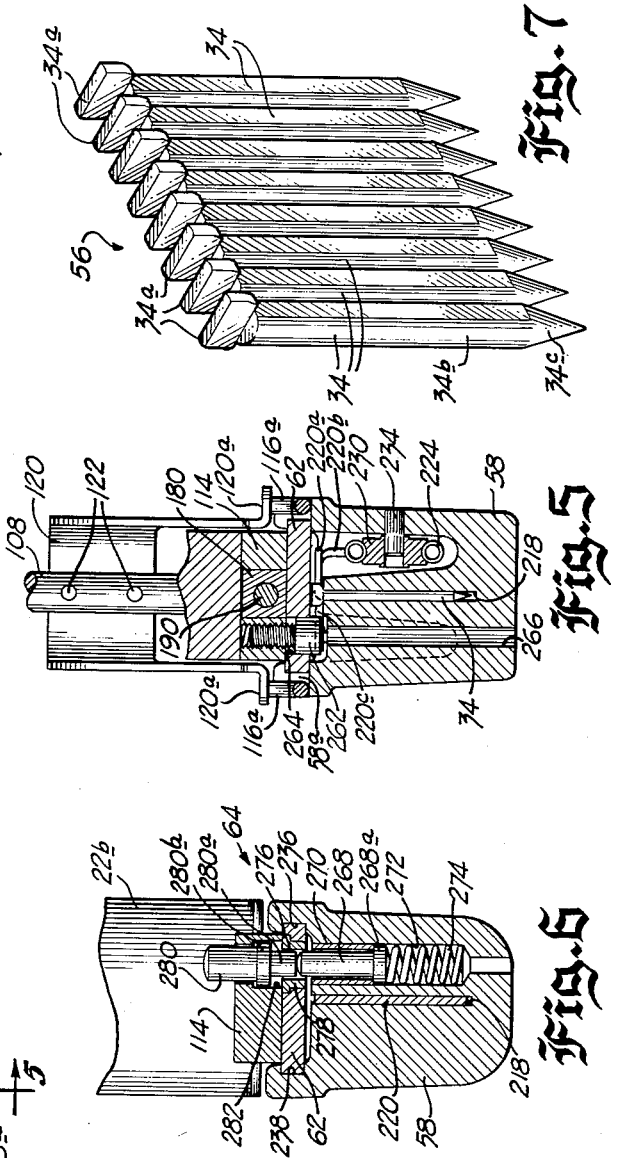
INVENTORS
OSCAR A. WANDEL AND
RICHARD H. DOYLE
BY
Mason, Kolehmainen, Rathburn and Wyss
ATTORNEYS.

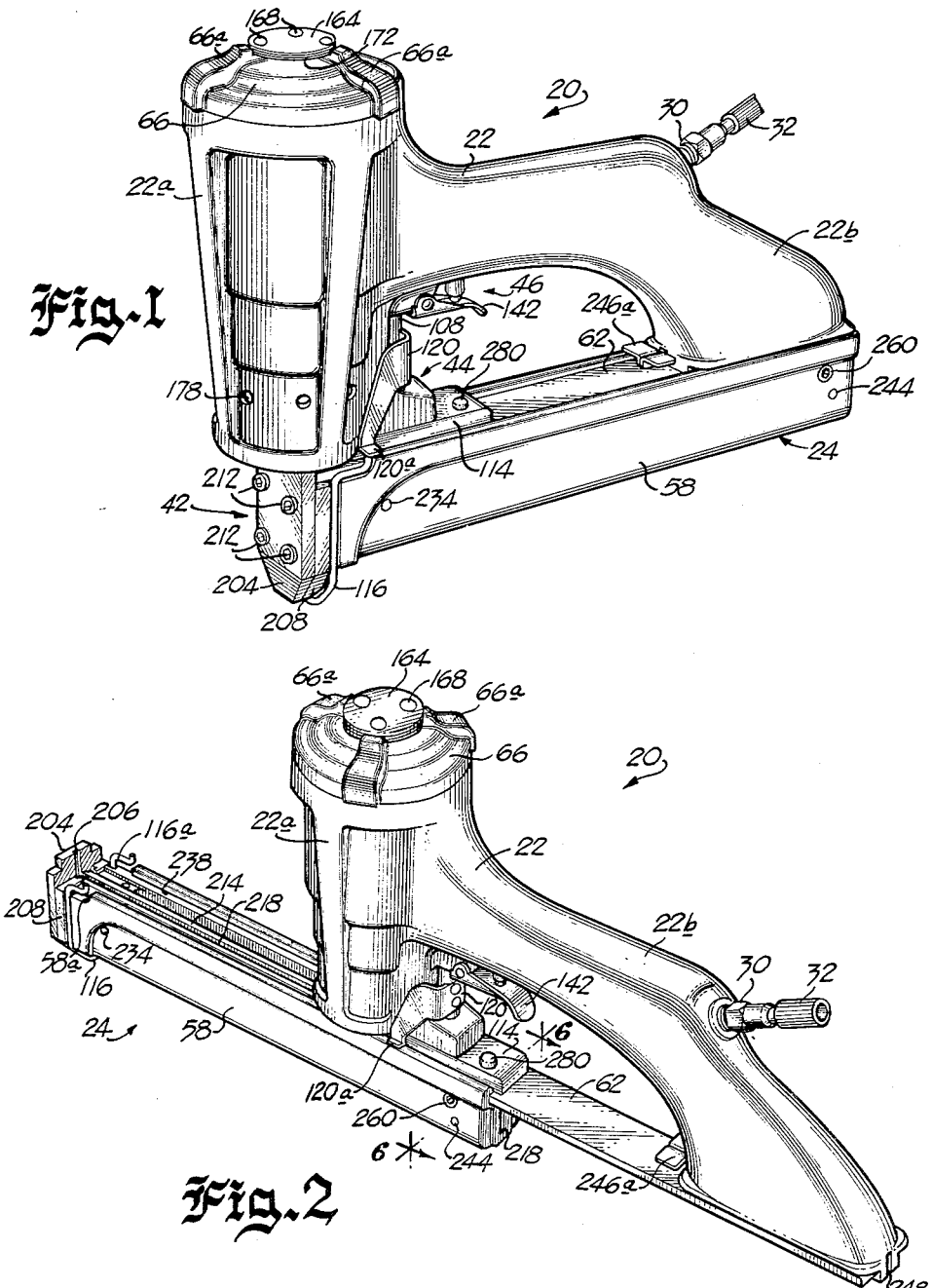

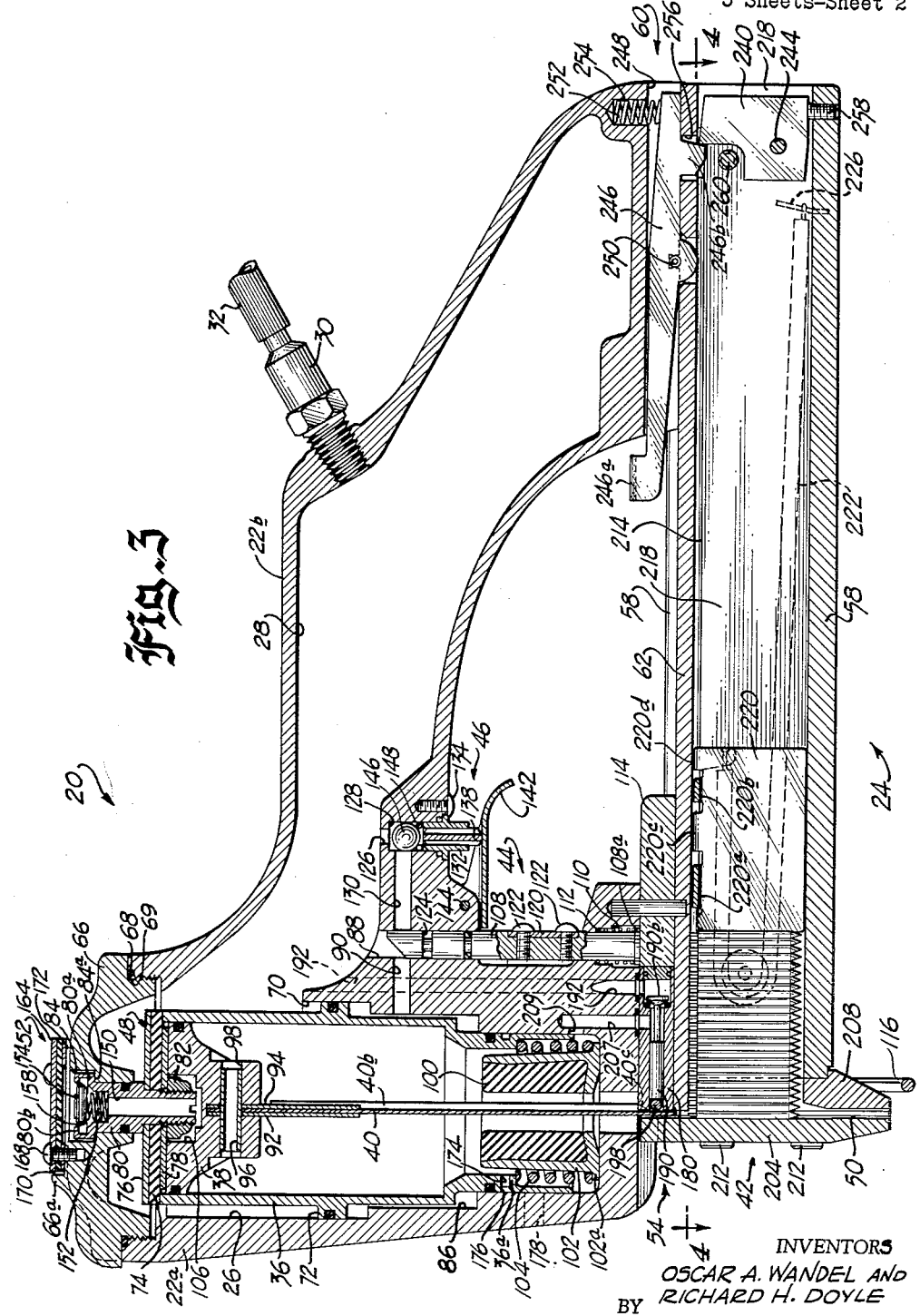

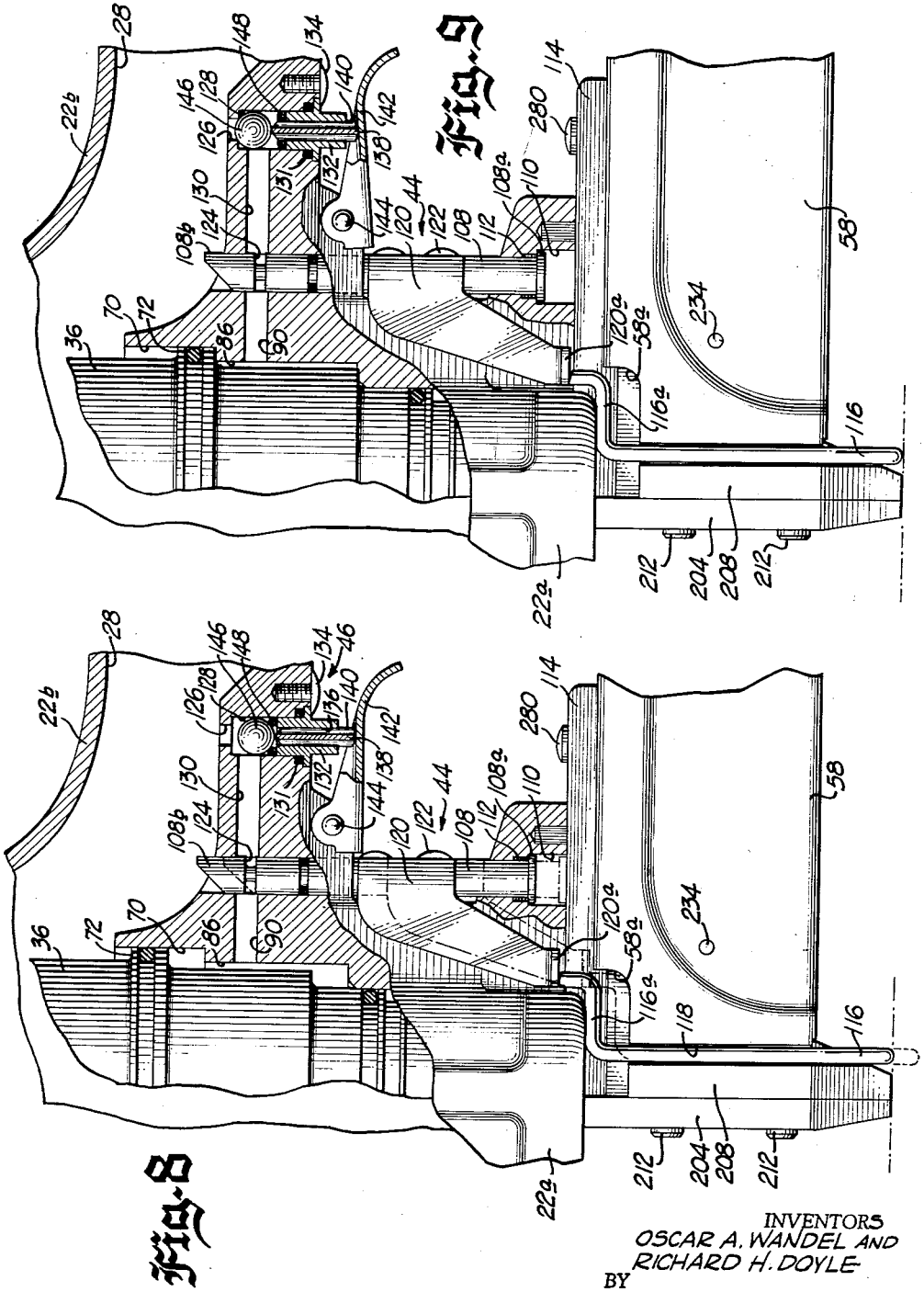

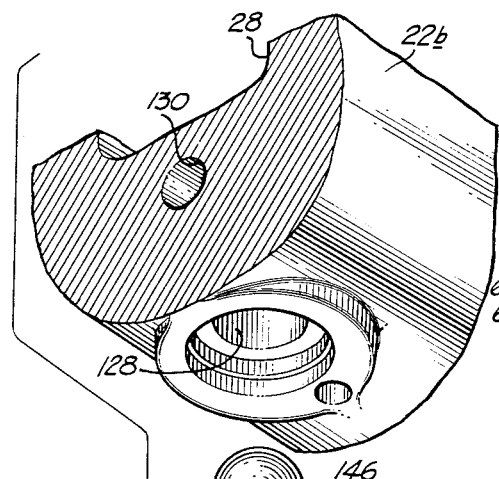
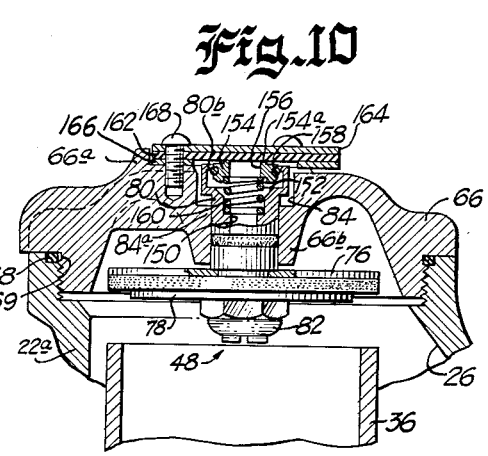
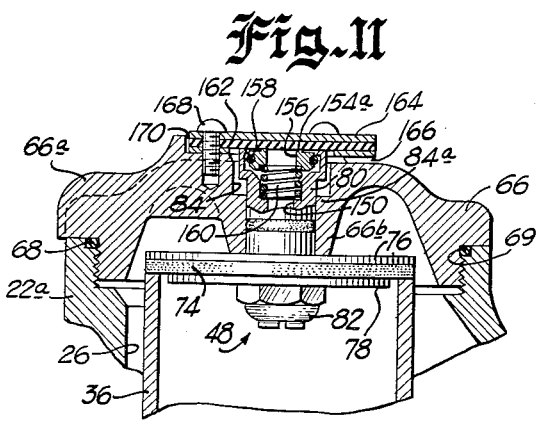
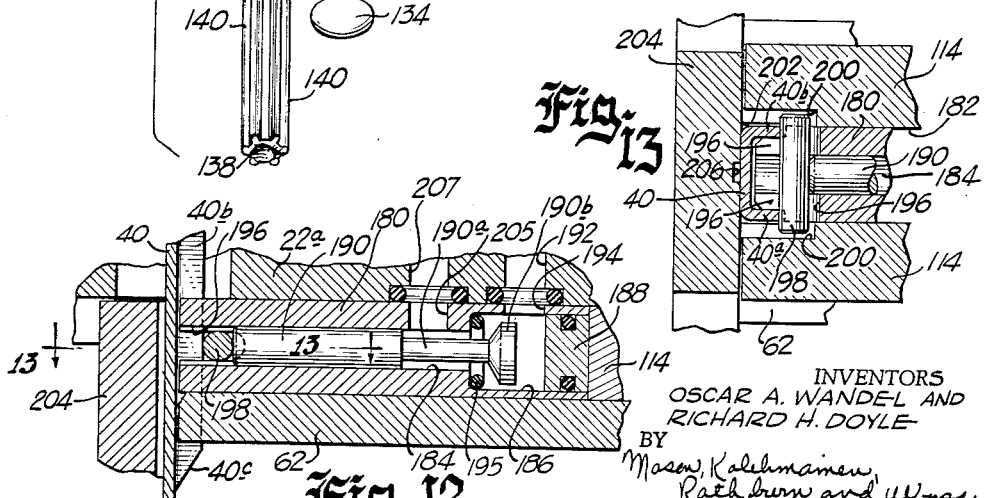

United States Patent Office 2,979,725
Patented Apr. 18, 1961

2,979,725

FASTENER DRIVING APPARATUS

Oscar A. Wandel, Mundelein, and Richard H. Doyle, Mount Prospect, Ill., assignors to Fastener Corporation, Chicago, Ill., a corporation of Illinois Filed Sept. 10, 1957, Ser. No. 683,170

30 Claims. (Cl. 1—106)

This application relates to a fastener driving apparatus and, more particularly, to a pneumatically actuated device for driving fasteners fed from a magazine into a workpiece.

A number of pneumatically operated devices have been developed for use in driving fasteners, such as staples and tacks, into workpieces. However, many of these prior devices are not capable of developing the forces necessary to drive large fasteners, such as nails, a sufficient depth into hard substances and of also withstanding the vibration and shock arising out of the use of these larger driving forces. One type of pneumatically operated fastener driving device which provides adequate force for driving fasteners to a great depth in hard substances is disclosed in the copending application of Oscar A. Wandel and Richard H. Doyle, Serial No. 630,883, filed December 27, 1956, and in the copending application of Richard H. Doyle, Serial No. 642,143, filed February 25, 1957, now Patent No. 2,944,522, granted July 12, 1960, both of which applications are assigned to the same assignee as the present application. However, in the type of driving device disclosed in these two applications, it is sometimes difficult to supply an adequate amount or to maintain the pressure of the compressed air in installations having a large number of driving devices. This difficulty largely arises out of the volume of compressed air used during the return stroke of each of the fastener driving tools. Further, because of the increased forces used in driving nails, the nails may be discharged from the driving apparatus at speeds sufficient to cause physical injury.

Accordingly, one object of the present invention is to provide a new and improved pneumatically operated fastener driving apparatus.

Another object is to provide a pneumatically operated device for driving nails which is so constructed as to withstand the forces of shock and vibration incurred in driving nails.

Another object is to provide a pneumatically operated driving device capable of developing forces sufficient to drive a large fastener, such as a nail, but which requires a reduced volume of compressed air for proper operation.

A still further object is to provide a fastener driving apparatus including a housing and magazine assembly slidably mounted on the housing for movement between a closed position in which the housing encloses the magazine and an open position in which the magazine assembly is uncovered to permit the insertion of a strip of fasteners.

Another object is to provide a fastener driving apparatus including both a pneumatically actuated fastener driving blade and structure defining a drive track for receiving said blade which can be shifted to move the drive track into and out of alignment with the driving blade.

Another object is to provide a pneumatically operated fastener driving apparatus including new and improved control means for preventing operation of the apparatus unless the fastener discharging portion thereof is disposed immediately adjacent a workpiece.

A further object is to provide a pneumatically operated fastener driving apparatus having a cylinder to which compressed air is supplied for driving a blade actuating piston, which apparatus includes new and improved means for selectively exhausting the cylinder.

Another object is to provide a fastener driving apparatus including both a pneumatically operated piston for actuating a fastener driving blade and new and improved pneumatic means for returning the piston to a normal position.

In accordance with these and many other objects, an embodiment of the present invention comprises a nailer housing having an enlarged head portion and a rearwardly extending handle, both of which are secured to opposite ends of a magazine cover plate. A cylinder movably mounted in the head portion is normally positioned in engagement with a movable main valve element to close off communication between the head portion, which is supplied with compressed air, and the interior of the cylinder in which is slidably mounted a piston having a fastener driving blade secured to the lower end thereof. In order to provide a supply of nails to be driven by the blade, a magazine housing is provided having structure at its forward end defining a drive track for removably receiving the driver blade. A pair of rails disposed within the magazine housing support the heads of a strip of nails so that a resiliently biased follower element also mounted on the rails biases the nail strip toward the drive track formed in one end thereof to advance the nails into the drive track and into alignment with the driver blade. The magazine housing is slidably mounted on the cover plate and is normally held in a closed position in which the drive track is aligned with the driver blade and in which the cover plate overlies the staple supporting means and follower means in the magazine by a first latching means. When a strip of nails is to be placed in the magazine, the first latching means is released and the magazine housing is moved forwardly relative to the head portion of the nailer so that the drive track moves out of alignment with the fastener driving blade and so that the cover plate no longer encloses the nail supporting tracks, the follower being retracted during this movement of the magazine to an open position. The magazine is latched in the open position by a second latch means comprising cooperating abutments on the nailer housing and the magazine housing.

When the nailer is to be operated, a first manually controlled valve means is operated and the nosepiece of the nailer is placed adjacent a workpiece so that, when an operating linkage which projects slightly beyond the end of the nosepiece engages the workpiece, a second valve is actuated. The concurrent operation of the first and second valve means shifts the cylinder to a displaced position in which the upper end of the cylinder and the main valve element are moved out of engagement to admit compressed air to the cylinder for driving the piston downwardly. During this downward movement the lower end of the driver blade engages the nail supplied to the drive track by the magazine assembly and drives it into a workpiece. The main valve element also moves upwardly in response to the shifting of the cylinder to close a new and improved exhaust valve assembly of the present invention. The downward movement of the fastener driving blade actuates a piston return valve assembly for preparing a path for admitting compressed air to the lower end of the cylinder for pneumatically returning the piston to its normal position. However, the shifting of the cylinder closes off communication between the piston return valve and the interior of the cylinder to prevent the admission of compressed air until such time as the cylinder is moved toward its normal position.

When either of the first and second valve means is released, the cylinder is shifted upwardly to move into engagement with the displaced main valve element which, in being engaged by the upper end of the cylinder, is displaced to momentarily open the exhaust valve assembly, thereby exhausting a portion of the compressed air enclosed between the upper end of the piston and the closed upper end of the cylinder. This momentary reduction in the pressure of the compressed air entrapped in the upper end of the cylinder, when considered in conjunction with the air pressure acting on the main valve element, restores the engaged main valve element and the shiftable cylinder to their normal positions. In moving to its normal position, the main valve element opens the exhaust valve assembly so that the compressed air entrapped in the cylinder above the piston is exhausted to the atmosphere. This permits the compressed air admitted by the piston return valve assembly and which is now supplied to the lower portion of the cylinder by virtue of the shifting of the cylinder to its normal position to elevate the piston to its normal position. In addition to the manually controlled operation of the nailer produced by operating and releasing the manually controlled first valve means, it is possible to intermittently operate the nailer by holding the first valve means in an operated condition and by periodically moving the nosepiece of the nailer into and out of engagement with the workpiece, thereby intermittently opening and closing the second valve means to shift the cylinder and to operate the blade actuating piston.

Many other objects and advantages of the present invention will become apparent from a consideration of the following description of an embodiment thereof which is shown in the following drawings wherein:

Fig. 1 is a perspective view of a pneumatically operated nailer embodying the present invention;

Fig. 2 is a perspective view of the pneumatically operated nailer shown with a magazine assembly in an open position;

Fig. 3 is an enlarged sectional view of the pneumatically operated nailer shown in Fig. 1;

Fig. 4 is a sectional view of the magazine assembly taken along line 4—4 in Fig. 3 assuming that the complete magazine construction is shown therein;

Fig. 5 is a fragmentary sectional view taken along line 5—5 in Fig. 4 again assuming that the complete construction is shown therein;

Fig. 6 is an enlarged fragmentary sectional view taken along line 6—6 in Fig. 2 and illustrates the details of a latching means for holding the magazine assembly in an open position;

Fig. 7 is an enlarged perspective view of a strip of nails adapted to be driven by the pneumatically operated nailer of the present invention;

Fig. 8 is an enlarged fragmentary sectional view of the nailer illustrating a safety valve arrangement for preventing inadvertent operation of the nailer and which is shown in a position in which the nailer is conditioned for operation;

Fig. 9 is an enlarged fragmentary sectional view similar to Fig. 8 illustrating the nailer in an operated condition;

Fig. 10 is an enlarged fragmentary sectional view of an exhaust valve assembly shown in the closed condition to which it is moved by operation of the nailer;

Fig. 11 is an enlarged fragmentary sectional view similar to Fig. 10 but illustrating the exhaust valve assembly in the position to which it is moved incident to restoring the nailer to a normal released condition;

Fig. 12 is an enlarged fragmentary sectional view of a piston return valve assembly illustrated in Fig. 3 but shown in an open condition;

Fig. 13 is a fragmentary sectional view taken along line 13—13 in Fig. 12 assuming that the complete structure of the piston return valve assembly is illustrated therein; and Fig. 14 is an exploded view of a manually actuated control valve assembly for the pneumatically operated nailer.

Referring now to Figs. 1, 2 and 3 of the drawings, therein is shown a pneumatically operated nailer, indicated generally as 20, which embodies the invention and which is capable both of driving nails into hard substances and of withstanding the forces of shock and vibration developed in driving these large fasteners. In general, the nailer 20 comprises a nailer housing 22 to which is slidably connected a magazine assembly 24. The nailer housing 22 includes an enlarged head portion 22a defining a chamber 26 which is continuously supplied with compressed air from an air reservoir defined by a cavity 28 formed in a rearwardly extending hollow handle portion 22b of the nailer housing. Compressed air is supplied to the reservoir 28 through an inlet nipple 30 to which is connected a suitable flexible air line 32.

To provide means for driving large fasteners, such as a headed nail 34 (Fig. 7), a cylinder 36 is slidably mounted within the chamber 26 to slidably receive a piston 38 to the lower end of which is connected a fastener driving blade 40. When the nailer 20 is to be actuated, a nosepiece assembly, indicated generally as 42, which is carried on the magazine assembly 24 is placed immediately adjacent a workpiece so that a safety control assembly 44 is operated. Thereafter, manual actuation of a control valve assembly 46 shifts the cylinder 36 out of engagement with a main valve element 48, thereby admitting compressed air to the interior of the cylinder 36 so that this compressed air actuates the piston 38 to force the driver blade 40 downwardly through a drive track 50 formed in the nosepiece assembly 42 to engage and drive the nail 34 supplied thereto by the magazine assembly 24.

Incident to admitting compressed air into the interior of the cylinder 36, the main valve element 48 is driven upwardly to close an exhaust valve assembly 52, thereby preventing the compressed air admitted to the cylinder 36 from being exhausted to atmosphere. The downward movement of the cylinder 36 also opens an exhaust passageway for the lower portion of the cylinder 36 to permit the air therein to be exhausted during downward movement of the piston 38. The downward movement of the driver blade 40 actuates a piston return vale assembly 54 for supplying compressed air to the lower end of the cylinder 36 which is used to pneumatically return the piston to its normal position. However, when the cylinder 36 is shifted to its lower or displaced position, the compressed air supplied by the operation of the piston return valve assembly 54 is not admitted to the cylinder 36.

When either the control valve assembly 46 or the safety valve assembly 44 is released, the open end of the cylinder 36 is shifted upwardly into engagement with the main valve element 48, thereby closing off the exhaust passageway for the lower portion of the cylinder 36 and opening a passageway to permit the compressed air supplied by the piston return vale assembly 54 to be admitted into the lower portion of this cylinder. When the cylinder 36 moves upwardly to engage the main valve element 48, this element is displaced upwardly a short distance to operate the exhaust valve assembly 52 so that it is momentarily opened to exhaust a small portion of the air entrapped in the cylinder 36 above the piston 38. This reduction in the pressure of the air contained within the upper portion of the cylinder 36 permits the compressed air in the chamber 26 to act on the upper surface of the main valve element 48 to force the engaged cylinder 36 and main valve element 48 downwardly to the normal position illustrated in Fig. 3.

This downward movement opens the exhaust valve assembly 52 to exhaust the compressed air contained within the upper portion of the cylinder 36 to atmosphere. At this time, the compressed air supplied to the lower portion of the cylinder 36 by the operated piston return valve assembly 54 is effective to elevate the piston 38 to the normal position illustrated in Fig. 3. In moving to this position, the driver blade 40 closes the piston return valve assembly 54 so that compressed air no longer is supplied to the lower portion of the cylinder. Thereafter, the pneumatic nailer 20 can be operated either manually by first actuating the safety valve assembly 44 and then operating the control valve assembly 46 or automatically by holding the valve assembly 46 operated and intermittently pressing the nosepiece assembly 42 against a workpiece so that the safety valve assembly 44 is intermittently operated.

In order to sequentially feed nails 34 from a strip 56 thereof (Fig. 7) into the drive track 50, the magazine assembly 24 is provided. This assembly includes a magazine housing 58 to the front end of which is secured the nosepiece assembly 42 which defines the drive track 50 for removably receiving the driver blade 40. The housing 58 also encloses a supporting structure for slidably receiving the nail strip 56 and a resiliently biased follower arrangement for feeding the strip 56 forwardly relative to the head portion 22a so that the individual nails 34 are sequentially fed into the drive track 50 for engagement by the driving blade 40. In order to hold the magazine assembly 24 in the closed position illustrated in Figs. 1 and 3 in which the drive track 50 is aligned with the driver blade 40, a first latch assembly 60 is provided which is capable of manual adjustment to insure the alignment of the drive track 50 with the driver blade 40. When a strip 56 of nails is to be supplied to the magazine assembly 24 the first latch assembly 60 is released and the magazine housing 58 is moved forwardly relative to the head portion 22a of the nailer housing 22 to an open position (Fig. 2) in which a magazine cover plate 62 which is secured to and extends between the head portion 22a and the rearwardly disposed end of the handle 22b no longer overlies the strip supporting means and the resiliently biased follower means. Means are provided on the nailer housing 22 for retracting the follower arrangement in the magazine assembly 24 so that, when the housing 58 is moved to the open position, a strip 56 of nails can easily be inserted into the magazine assembly 24. Further, to prevent inadvertent operation of the nailer 20 when the magazine assembly 24 is in the open position, the safety valve assembly 44 is disabled so that it cannot be operated to initiate shifting movement of the cylinder 36. A second latch assembly 64 (Fig. 6) is provided for holding the magazine assembly 24 in the open position illustrated in Fig. 2.

The nails 34 are one type of elongated fastener which can be driven by the pneumatically operated nailer 20 although it should be understood that fasteners of different sizes and shapes can also be used with the nailer 20 by modifying the configurations of the drive track 50, the drive blade 40, and the strip supporting and follower means in the magazine assembly 24. The nails 34, which can be automatically formed from wire stock, each comprise a headed portion 34a formed integral with the upper end of a shank portion 34b which is provided at its lower end with a conical pointed portion 34c. A plurality of the nails 34 are detachably joined together at their shank portions 34b, preferably by automatic machinery, to form the nail strip 56.

Referring now more specifically to the details of the construction of the nailer 20, the nailer housing 22 (Fig. 3) preferably comprises a casting having the rearwardly extending hollow handle portion 22b which defines the compressed air reservoir or cavity 28 and the hollow upstanding and generally cylindrical head portion 22a defining the chamber 26 which is open at its upper end. The upper end of the chamber 26 is closed by a closure cap 66 which is threadedly secured to the head portion 22a with a sealing O-ring 68 positioned in an annular recess 69 interposed therebetween to prevent leakage of air from the chamber 26. In addition to preventing leakage of air from the chamber 26, the O-ring 68 is distorted by the pressure of the air in the chamber to resiliently engage the adjacent surfaces of the cap 66 and of the housing 22 and thus prevent removal of the cap 66. This cap can easily be turned on by hand and the subsequent admission of compressed air having a pressure as low as twenty pounds per square inch so distorts the O-ring 68 that the cap 66 cannot be removed even with tools. The closure cap 66 supports the exhaust valve assembly 52 and the main valve element 48 in a position spaced vertically above the cylinder 36. The chamber 26 also defines a cylindrical portion 70 in which is slidably mounted an annular piston 72 formed integral with the cylinder 36.

The main valve element 48 (Figs. 3, 10 and 11), which normally closes the open upper end of the cylinder 36 and which is shifted out of engagement with the cylinder 36 upon downward movement thereof, comprises a resilient element 74 which is interposed between a pair of circular metal plates 76 and 78. The plates 76 and 78 and the resilient element 74 are held in an assembled relationship and are secured to the lower end of a supporting element or post 80 by a nut 82. The post 80 is slidably mounted in a shouldered bore 84 in the closure cap 66. The compressed air acting on the upper surface of the plate 76 provides a downwardly directed force which seats a shouldered portion 80a on the supporting element 80 on a corresponding shoulder 84a formed in the bore 84 in the closure cap 66, thereby to maintain the main valve element 48 in the normal position illustrated in Fig. 3 in which the outer extremity of the resilient element 74 engages the annular upper edge of the cylinder 36.

The upper edge of the cylinder 36 is urged into seating engagement with the resilient element 74 by compressed air which is supplied below the piston 72 to the cylindrical portion 70 and to a reduced diameter cylindrical portion 86 which is also formed in the head portion 22a of the nailer housing 22. Compressed air is normally supplied to these cylindrical portions through the upper extremity of a bore 88 and a passageway 90 which are formed in the housing 22. The effective area of the cylinder 36 which is disposed below the piston 72 is greater than the effective upper area of the cylinder and, accordingly, a force differential is provided for normally urging the cylinder 36 upwardly into seating engagement with the resilient element 74 of the main valve element 48. However, the force of the compressed air acting on the upper surface of the plate 76 exceeds this force differential so that the main valve element 48 and the piston 36 are held in the normal position illustrated in Fig. 3 which is determined by the engagement of the shoulder 80a on the supporting element 80 with the shoulder formed in the closure cap 66.

Referring now to the piston 38 and the driver blade 40 (Fig. 3), the blade 40 comprises a substantially U-shaped element having a pair of vertically upstanding sidewalls 40a and 40b (Fig. 13) which are tapered at their lower ends, as indicated at 40c (Figs. 3 and 12). To secure the driver blade 40 to the piston 38, a pair of rigid connecting elements 92 and 94 are brazed or otherwise rigidly secured to opposite sides of the bight portion of the upper end of the blade 40. The blade 40 and the elements 92 and 94 are apertured at their upper ends to receive a hollow pin 96 which extends through a transverse opening 98 formed in a lower portion of the piston 38.

To cushion the downward movement of the piston 38 during its power stroke, a bumper assembly is provided comprising a centrally apertured resilient element 100 (Fig. 3) which is received within a metal sleeve 102 having an outwardly extending annular flange 102a. The bumper assembly is seated on the lower wall of the chamber 26 by a compression spring 104 which is interposed between the flange 102a and an inwardly directed shoulder 36a formed integral with the cylinder 36. Thus, the compression spring 104 serves to resiliently urge the bumper assembly into engagement with the lower wall of the chamber 26 and also serves to urge the cylinder 36 in an upward direction to hold the main valve element 48 in engagement with the annular upper edge of this cylinder during the assembly of the nailer 20 and prior to the introduction of compressed air into the cavity 28. To provide a stop for limiting upward movement of the piston 38 under the control of the compressed air admitted by the piston return valve assembly 54, the upper surface of the piston 38 moves into engagement with the lower metal plate 78 of the main valve element 48. The nut 82 and the lower end of the supporting post 80 are received within an opening 106 formed in the upper end of the piston 38.

As described above, the safety valve assembly 44 (Figs. 3, 8 and 9) is provided for preventing operation of the nailer 20 unless the nosepiece assembly 42 through which the drive track 50 extends is disposed in engagement with or immediately adjacent a workpiece. Since the operation of the nailer 20 is initiated by shifting the position of the cylinder 36, the safety valve assembly 44 includes valve means which operate in conjunction with the control valve assembly 46 to selectively control the admission of compressed air to and the exhaustion of compressed air from the cylindrical portions 70 and 86. More specifically, the safety valve assembly 44 includes a valve stem 108 which is slidably received at its upper end within the bore 88 and at its lower end within a shouldered bore 110 formed in the nailer housing 22. A compression spring 112, which encircles the lower end of the valve stem 108 and which is interposed between a shoulder in the bore 110 and an annular flange 108a formed on the valve stem 108, operates in conjunction with air pressure acting on the upper end of this valve stem to normally bias it to the position illustrated in Fig. 3 in which the lower end of the valve stem 108 bears against a build up block 114 secured to the lower wall of the head portion 22a. In this position, and as described above, compressed air from the reservoir 28 passes through the upper end of the bore 88 and the passageway 90 to be supplied to the lower part of the cylindrical portion 70 and to the cylindrical portion 86, thereby providing a force differential for holding the cylinder 36 in the normal position illustrated in Fig. 3.

To actuate the safety valve assembly 44, a generally U-shaped yoke element 116 is slidably mounted in oppositely formed grooves 118 on the magazine housing 58. The upper free ends of the yoke element 116 are offset and upturned, as indicated at 116a, to be adapted to engage a pair of outwardly turned end portions 120a (Figs. 1, 2 and 9) on a second somewhat U-shaped yoke element 120, the bight of which is secured within a recess formed in the valve stem 108 by a plurality of machine screws 122. In the released position of the safety valve assembly 44, the compressed air in the cavity 28 and the compression spring 112 bias the valve stem 108 to the position illustrated in Fig. 3 so that the outwardly turned ends 120a on the second yoke element 120 bear against the offset and upwardly turned end portions 116a of the first yoke element 116 to hold these end portions in engagement with the walls of a pair of similar and oppositely located recesses 58a (Fig. 9) formed in the magazine housing 58.

When the nosepiece assembly 42 of the nailer 20 is moved into engagement with a workpiece, the first yoke element 116 moves upwardly by sliding within the grooves 118 so that the offset end portions 116a bear against the outwardly turned end portions 120a to elevate the second yoke element 120. This moves the valve stem 108 upwardly to the position illustrated in Fig. 8 in which an upper end portion 108b of the valve stem 108 closes off the upper end of the bore 88. However, this upward movement of the valve stem 108 concurrently moves an annular recess 124 formed in the valve stem 108 into alignment with the passageway 90 so that compressed air from the cavity 28 now flows to the cylindrical portions 70 and 86 through a passageway 126, the upper end of a bore 128, a passageway 130, the annular recess 124, and the passageway 90. The passageways 126 and 130 and the bore 128 form a part of the control valve assembly 46. Accordingly, the operation of the safety valve assembly 44 closes off one system of passageways for supplying compressed air for holding the cylinder 36 in its normal position and opens up another system of passageways controlled by the control valve assembly 46 for supplying compressed air for maintaining the cylinder 36 in its normal position. When the nosepiece assembly 42 is moved out of engagement with the workpiece, the compressed air in the cavity 28 and the compression spring 112 restore the safety valve assembly 44 to the normal position illustrated in Fig. 3 in which the cylinder 36 is held in its normal position by the compressed air supplied to the cylindrical portions 70 and 86 through the upper portion of the bore 88 and the passageway 90.

The safety valve assembly 44 is rendered inoperative when the magazine assembly 24 is moved to the open position (Fig. 2) in order to prevent the operation of the nailer 20. It is necessary to prevent operation of the nailer 20 when the magazine assembly 24 is in this open position because the drive track 50 is out of alignment with the blade 40 and thus an actuation of this blade would drive it into the magazine with resulting damage to the blade 40 and the magazine assembly 24. The assembly 44 is rendered ineffective when the magazine assembly 24 is moved to the open position by moving the offset ends 116a of the element 116 out of alignment with the projecting ends 120a of the operator element 120. Accordingly, actuation of the element 116 has no effect on the position of the valve stem 108.

The control valve assembly 46 (Figs. 3, 8, 9 and 14) is manually controlled and operates in conjunction with the safety valve assembly 44 to control the shifting of the cylinder 36. The control valve assembly 46 includes a flanged valve body 132 which is secured within the bore 128 in the handle portion 22b by a headed fastener 134, an O-ring 131 sealing the interface between the housing 22 and the valve body 132. The valve body 132 is provided with a centrally disposed opening or passageway 136 in which is slidably mounted a valve stem 138 having a plurality of peripherally spaced and axially extending slots 140 formed therein. The lower end of the valve stem 138 engages an upper surface of a trigger element 142 which is pivotally mounted on the nailer housing 22 by a pivot pin 144. A ball valve element 146, which is freely movable within the upper end of the bore 128, is forced into seating engagement with a resilient O-ring 148 by the compressed air supplied through the passageway 126 so that, in the normal position of the control valve assembly 46, the passageway 136 is closed and compressed air is supplied through the passageway 126 and the bore 128 to the passageway 130. The passageway 130, however, is normally closed off from communication with the passageway 90.

When the pneumatic nailer 20 is to be operated and the safety valve assembly 44 is operated to the position illustrated in Fig. 8, the annular recess 124 on the valve stem 108 places the passageways 90 and 130 in communication so that compressed air is supplied from the reservoir 28 through the passageways 126, 130 and 90 to the cylindrical portions 70 and 86. To actuate control valve assembly 46, the trigger piece 142 is pivoted in a counterclockwise direction to move the valve stem 138 upwardly. In moving upwardly, the lower end of the ball valve 146 is engaged and this element is moved up into seating engagement with the edges of the passageway 126 (Fig. 9), thereby to close off communication between the compressed air in the cavity 28 and the cylindrical portions 70 and 86. Concurrently with moving the ball valve 146 upwardly, this element is moved out of seating engagement with the resilient O-ring 148 to open a passageway for exhausting the compressed air in the cylindrical portions 70 and 86 to the atmosphere. This exhaust passageway extends from the cylindrical portions 70 and 86 through the passageway 90, the annular recess 124, the passageway 130, the bore 128, and the slots 140 formed in the valve stem 138. The exhaustion of compressed air from the portion of the cylindrical portion 70 disposed below the piston 72 and from the cylindrical portion 86 shifts the cylinder 36 to intiate a single power stroke of the piston 38 during which the nail 34 disposed in the drive track 50 is driven into the workpiece.

More specifically, when this compressed air is exhausted, the compressed air in the chamber 26 acting on the upper surface of the piston 72 initiates downward movement of the cylinder 36. During this initial downward movement, the compressed air acting on the edge surface of the resilient element 74 holds this element in sealing engagement with the annular upper edge of the cylinder 36. However, after a predetermined displacement of the cylinder 36, the resilient element 74 snaps back into engagement with the upper metal plate 76 to provide a large area opening between the main valve element 48 and the upper open end of the cylinder 36, thereby admitting a large volume of compressed air at full line pressure to the interior of the cylinder. The admission of compressed air to the interior of the cylinder 36 simultaneously closes the exhaust valve assembly 52 and initiates the power stroke of the piston 38 during which the nail 34 disposed in the drive track 50 is driven into the workpiece by the downward movement of the driver blade 40.

Referring now more specifically to the exhaust valve assembly 52 (Figs. 3 and 10), this valve assembly is operated by the shifting movement of the main valve element 48 to first close off communication between the atmosphere and the interior of the chamber 26 when the cylinder 36 is shifted downwardly to cause the operation of the piston 38, is then momentarily opened by the upward movement of the cylinder 36 into engagement with the main valve element 48 to bleed a small portion of the compressed air in the upper portion of the cylinder 36 to atmosphere, and is thereafter operated to an open condition by the movement of the cylinder 36 to its normal position so as to exhaust the compressed air in the cylinder 36 disposed above the piston 38, thereby permitting this piston to return to its normal position under the control of the piston return valve assembly 54. The exhaust valve assembly 52 includes an axially extending passageway 150 formed in the supporting member 80 which opens into an enlarged countrbore 152 formed in the upper end of the supporting member 80. An exhaust valve element 154 having an upwardly extending annular boss 154a surrounding a centrally formed opening 156 therein is disposed within the counterbore 152 and is provided with a peripherally extending resilient O-ring 158 which is normally urged into seating engagement with an inwardly extending flange 80b formed integral with the supporting member 80 by a compression spring 160 which is interposed between the lower surface of the valve element 154 and a shoulder formed in the supporting member 80. A valve seat for the exhaust valve assembly 52 is provided by a resilient element 162 which is interposed between an upper circular metal plate 164 and an annular lower metal washer 166. The superimposed elements 162, 164 and 166 are secured within three recessed portions 170 formed in three upstanding portions 66a (Figs. 1 and 10) on the closure cap 66 so that the opening 156 is normally in communication with the atmosphere through three peripherally spaced openings 172 defined by the three bossed portions 66a.

In the normal condition of the pneumatic nailer 20, the exhaust valve assembly 52 is in the open position illustrated in Fig. 3 in which the interior of the cylinder 36 is placed in communication with the atmosphere through the passageway 150, the counterbore 152, the opening 156, and the three angular spaced openings 172. However, when the cylinder 36 is lowered out of engagement with the main valve element 48, as described above, and the compressed air from the chamber 26 is admitted into the interior of the cylinder 36, the compressed air in the chamber 26 acts on the greater effective lower surface of the main valve element 48 so that this element and the supporting member 80 move upwardly to the position illustrated in Fig. 10. In this position, the bossed portion 154a of the exhaust valve element 154 is moved into seating engagement with the lower surface of the resilient element 162 to close off communication between the passageway 150 and the atmosphere and thus preventing the compressed air in the chamber 26 from being exhausted. As indicated in Fig. 10, the upward movement of the main valve element 48 and of the supporting member 80 is not limited by engagement of the metal plate 76 with a downwardly projecting portion 66b of the closure cap 66, but rather is limited by the engagement of the bossed portion 154a with the resilient element 162. The exhaust valve assembly 52 remains in this condition until such time as the pneumatic nailer 20 is released.

Referring back to the above described initiation of the downward movement of the cylinder 36, this downward movement opens a valve means for connecting the lower portion of the interior of the cylinder 36 to atmosphere so that the piston 38 is free to be driven downwardly by the compressed air admitted into the upper portion of the cylinder 36 by the opening of the main valve element 48. More specifically, a lower portion of the cylinder 36 is provided with one or more passageways 174 (Fig. 3) which communicate with an annular recess 176 formed on the outer surface of the cylinder 36. When this cylinder moves downwardly to its displaced position, the annular recess 176 is moved into alignment with a plurality of openings 178 (Figs. 1 and 3) formed in the head portion 22a of the nailer housing 22. Thus, the passageway 174, the annular recess 176, and the passageways or openings 178 provide an exhaust system for exhausting the air trapped below the piston 38 from the cylinder 36 to permit free downward movement of this piston under the control of the compressed air supplied from the chamber 26.

The piston return valve assembly 54 (Figs. 3, 12 and 13) is operated by downward movement of the driver blade 40 to supply compressed air to the lower portion of the interior of the cylinder 36 to provide a means for pneumatically returning the piston 38 to its normal position following the completion of its driving stroke and upon the release of the pneumatic nailer 20. The assembly 54 comprises a valve body 180 which is disposed within a slot 182 formed in the build up block 114. The valve body 180 is provided with a bore 184 and with a counterbore 186, one end of which is closed by a plug 188. A valve stem 190 is slidably mounted in the bore 184 and is provided with a reduced diameter portion 190a connecting the valve stem with a tapered valve head 190b which is disposed within the counterbore 186. In the normal position of the piston return valve assembly 54, compressed air from the cavity 28 is supplied through a passageway 192 and a passageway 194 in the valve body 180 to the counterbore 186. This compressed air acts on the valve head 190b to firmly seat it on an O-ring 195, thereby preventing a flow of the compressed air beyond the counterbore 186.

To provide a means for operating the piston return valve assembly 54, the outer end of the valve body 180 is provided with a slot 196 in which is slidably disposed a pin 198 with its ends projecting into a pair of recesses 200 formed in the forward end of the build up block 114. The forward ends of the valve body 180, and the cover plate 62 also define a substantially U-shaped opening 202 for slidably receiving the driver blade 40. In the normal position of the piston return valve assembly 54, the driver blade 40 is retracted to the position illustrated in Fig. 3 so that the compressed air acting on the valve stem 190 biases the outer end thereof into engagement with the pin 198 and in turn biases this pin into engagement with the bight portion of the driver blade 40.

The piston return valve assembly 54 is actuated by downward movement of the driver blade 40 during which the inclined surfaces 40c on the legs 40a and 40b of the driver blade move into engagement with the ends of the pin 198 so that this pin rides up on the inclined surfaces 40c to be engaged by the end surfaces of the offset legs 40a and 40b of the driver blade 40. This movement displaces the pin 198 to the right (Figs. 12 and 13) so that the valve stem 190 is displaced to the position illustrated in Fig. 12 in which the valve head 190b is moved out of engagement with the O-ring 195. This permits the compressed air supplied to the counterbore 186 to flow through a portion of the bore 184, a passage 205 formed in the valve body 180, and a passageway 207 formed in the head portion 22a. This provides a supply of compressed air which is to be admitted to the lower portion of the cylinder 36 to return the piston 38 to its normal position.

However, the compressed air supplied by the operation of the valve assembly 54 is not immediately supplied to the cylinder 36. More specifically, the downward movement of the cylinder 36 to its displaced position moves the lower edge of this cylinder into sealing engagement with a passageway 209 (Fig. 3) which is in communication with both the lower portion of the chamber 26 and the passageway 207. When the cylinder 36 is moved upwardly, the passageway 209 is opened to admit the compressed air in the passageway 207 into the lower end of the cylinder 36. The piston return valve assembly 54 remains in its operated condition until such time as the driver blade 40 is withdrawn to its normal position in response to the retraction of the piston 38 under the control of the compressed air provided by the valve assembly 54. At this time and as the side walls 40a and 40b of the driving blade 40 are moved out of engagement with the pin 198, the compressed air acting on the valve head 190b moves the valve stem 190 to the left (Figs. 12 and 13) to the position illustrated in Fig. 3 in which the pin 198 is biased against the bight portion of the blade 40 and in which the valve head 190b seats against the O-ring 195 to close off communication between the bore 184 and the counterbore 186, thereby terminating the application of compressed air from the reservoir or cavity 28 to the lower end of the cylinder 36.

Whenever the control valve assembly 46 or the safety valve assembly 44 or both of these assemblies are released, the pneumatic nailer 20 is restored to a normal position in which the piston 38 and the cylinder 36 are restored to the position illustrated in Fig. 3 of the drawings. More specifically, when the control valve assembly 46 is released, the compressed air acting on the ball valve element 146 forces the valve stem 138 downwardly and seats upon the O-ring 148 to close off the above described series of passageways for exhausting compressed air from the lower part of the cylindrical portion 70 and the cylindrical portion 86. Concurrently therewith, as the ball valve 146 moves out of engagement with the edges of the passageway 126, compressed air is supplied through the passageway 126, the bore 128, the passageway 130, the annular recess 124, and the passageway 90 to again provide compressed air to the cylindrical portions 70 and 86. This compressed air can also be supplied to the cylindrical portions 70 and 86 and the exhaust passageway can be closed off by the release of the safety valve assembly 44 which permits the valve stem 108 to move to the position illustrated in Fig. 3 in which the upper portion of the bore 88 places the passageway 90 in communication with the cavity 28 and in which the annular recess 124 is out of alignment with the passageway 130.

In supplying compressed air to the cylindrical portions 70 and 86, the cylinder 36 is moved upwardly by the unequal forces acting on the upper surface of the cylinder 36 and on the effective surfaces of this cylinder disposed beneath the piston 72. This upward movement of the cylinder 36 closes off the exhaust passageway for the lower portion of this cylinder and also permits the piston return valve assembly 54 to supply compressed air to the cylinder for returning the piston 38. More specifically, the upward movement of the cylinder 36 moves the annular recess 176 out of communication with the plurality of openings 178 to seal off communication between the lower portion of the cylinder 36 and the atmosphere. Concurrently therewith, the lower edge of the cylinder 36 moves beyond the passageway 209 so that the compressed air provided by the operated piston return valve assembly 54 flows from the passageway 207 through the passageway 209 into the lower portion of the cylinder 36 to provide a source of compressed air for elevating the piston 38 to its normal position. However, the piston 38 is not moved upwardly at this time because of the compressed air entrapped in the upper portion of the cylinder 36.

The upward movement of the cylinder 36 due to the release of either the control valve assembly 46 or the safety valve assembly 44 operates the exhaust valve assembly 52 to bleed off or exhaust a small portion of the compressed air entrapped in the upper portion of the cylinder 36. More specifically, as the cylinder 36 moves upwardly it moves beyond the normal position illustrated in Fig. 3 to engage the resilient element 74 of the main valve element 48 which is now disposed in position illustrated in Fig. 10. Upon engaging the main valve element 48, the engaged cylinder 36 and main valve element 48 are moved further upwardly to the position illustrated in Fig. 11 by the upwardly directed force due to the compressed air acting on the effective surfaces of the cylinder 36 positioned below the piston 72, which force exceeds the downwardly directed forces due both to the compressed air in the chamber 26 acting on the upper surface of the plate 76 and the force of the compression spring 160 which is interposed between the valve element 154 and the supporting member 80.

As the main valve element 48 and the cylinder 36 move upwardly to the position illustrated in Fig. 11, which is determined by the engagement of the plate 76 with the depending portion 66b of the cap 66, the valve element 154 moves downwardly against the action of the compression spring 160. In moving downwardly, the O-ring 158 is momentarily moved out of sealing engagement with the inwardly directed flange 80b on the supporting member 80 so that a small amount of the compressed air entrapped in the upper portion of the cylinder 36 passes through the passageway 150, the counterbore 152, and between the O-ring 158 and the inwardly directed flange 80b to be exhausted to the atmosphere through the plurality of openings 172. Thereafter and as the upper surface of the plate 76 moves into engagement with the depending portion 66b, the upper surface of the supporting member 80 moves into engagement with the resilient element 162, thereby to again completely close the exhaust valve assembly 52. This momentary opening of the exhaust valve assembly 52 slightly reduces the pressure of the compressed air contained within the upper end of the cylinder 36 and causes the restoration of the main valve element 48 and the cylinder 36 to the normal position illustrated in Fig. 3.

More specifically, the reduction of the pressure of the compressed air contained within the upper portion of the cylinder 36 produces a force differential across the main valve element 48 which is downwardly directed. Accordingly, the main valve element 48 and the cylinder 36, which is in engagement therewith, move downwardly to the position illustrated in Fig. 3 which is determined by the engagement of the shoulder 80a on the supporting member 80 with the shoulder 84a provided by the counterbore 84. In thus moving downwardly, the bossed portion 154a of the exhaust valve element 154 is moved out of engagement with the resilient element 162 and the compression spring 160 again seats the O-ring 158 on the inwardly directed flange 80b. In this position, the exhaust valve assembly 52 is fully opened and the compressed air within the upper portion of the cylinder 36 is rapidly exhausted to the atmosphere through the passageway 150, the counterbore 152, the opening 156, and the plurality of openings 172. The exhausting of the compressed air contained within the upper portion of the cylinder 36 permits the compressed air supplied to the lower portion thereof to rapidly elevate the piston 38 to the normal position ilustrated in Fig. 3 in which the upper end of this piston engages the lower plate 78 on the main valve element 48.

In moving upwardly, the piston 38 retracts the driver blade 40 so that the side edges 40a and 40b thereof move out of engagement wtih the pin 198, thus permitting the closure of the piston return valve assembly 54, as previously described, so that compressed air is no longer supplied to the lower portion of the cylinder 36. In the event that the compressed air which holds the piston 38 in its uppermost position becomes dissipated, the downward movement of the piston 38 and of the blade 40 again operates the piston return valve assembly 54. Since the cylinder 36 remains in its normal position, the operation of the valve assembly 54 permits the introduction of compressed air from the reservoir 28 into the lower portion of the cylinder 36 to again return and hold the piston 38 in its normal position.

Referring now more specifically to the magazine assembly 24, this assembly includes both the nosepiece assembly 42, which defines the drive track 50 for removably receiving the driver blade 40, and resiliently biased means for feeding the individual nails 34 from the strip 56 into the drive track 50. The magazine assembly 24, which is movably mounted on the nailer housing 22, is held in a closed position in which the drive track 50 is aligned with the driver blade 40 by the first latch assembly 60 and is secured in an open position in which the strip follower is retracted to permit the insertion of an additional strip 56 by the second latch assembly 64. In moving to the open position, the safety valve assembly 44 is rendered incapable of operation to prevent the inadvertent operation of the nailer 20.

The nosepiece assembly 42 (Figs. 3 and 4) which is secured to the forward end of the magazine asembly 24, comprises an outer plate 204 having a longitudinal extending groove or depression 206 (Fig. 13) for receiving the shank 34b of the nail 34 and an inner plate 208 having a substantially U-shaped recess 210 formed therein for slidably receiving the blade 40. The groove 206 and the recess 210 conjointly define the drive track 50. The plates 204 and 208 are secured to the forward end of the U-shaped magazine housing 58 by a plurality of headed fasteners 212. As indicated in Fig. 4, the plate 208 cooperates with a recess in the housing 58 to form the groove 118 in which the first operator yoke 116 in the safety valve assembly 44 is slidably mounted.

To provide a means for slidably supporting a nail strip 56, the magazine assembly 24 includes a pair of parallel and spaced rails 214 and 216 which are formed integral with and which project upwardly from a lower wall of the magazine housing 58 to define a slot 218 therebetween. The shanks 34b of the nails 34 forming the strip 56 are disposed in the slot 218 so that the lower edges of enlarged head portions 34a slidably engage the upper edges of the rails 216 and 218. The trailing or rearward end of the strip 56 is adapted to be engaged by a follower element 220 comprising a vertical plate which is disposed within the slot 218 and which is provided with four alternately offset portions 220a, 220b, 220c and 220d which slidably engage the top edges of the rails 214 and 216 to slidably support the follower 220. The follower 220 is biased toward the front of the magazine assembly 24 by a pair of tension springs 222 and 224 which are disposed in two cavities 223 and 225, respectively, formed in the housing 58 at opposite sides of the rails 214 and 216. One end of these springs is secured to a lower wall of the housing 58 by a pair of pins 226 and intermediate portions of these springs pass around a pair of pulleys 228 and 230 which are rotatably mounted on the sidewalls of the housing 58 within the cavities 223 and 225 by a pair of pins 232 and 234, respectively. The other end of the spring 222 is secured to the projecting portion 220d and the other end of the spring 224 is secured to the projecting portion 220b. Accordingly, the coil springs 222 and 224 bias the follower 220 to the left (Figs. 3 and 4) to bias the nail strip 56 toward the drive track 50 in the nosepiece assembly 42.

To slidably mount the magazine assembly 24 on the nailer housing 22, the cover plate 62 is provided. The front end of the plate 62 is secured to the build up block 114 carried on the head portion 22a and the rear end of the plate 62 is secured to a lower portion of the hollow handle 22b. The magazine housing 58 is provided with a pair of slots 236 and 238 which slidably receive the edges of the cover plate 62 to permit the magazine assembly to be moved from the closed position illustrated in Fig. 1 to the open position illustrated in Fig. 2. In Fig. 1, the cover plate 62 overlies the strip supporting tracks 214 and 216, the follower 220, and the biasing springs 222 and 224, while in the open position (Fig. 2), the nail supporting rails 214 and 216 are exposed to permit the insertion of a nail strip 56 into the slot 218. Further, in the open position of the magazine assembly 24 the upper end of the drive track 50 is unobstructed to facilitate the clearing of a nail jam without requiring the removal of any of the nosepiece assembly 42.

The first latching assembly 60 (Fig. 3) is provided for securing the magazine assembly 24 on the nailer housing 22 in its closed position and it includes means for adjusting the latching position of the assembly 60 to insure that the drive track 50 is aligned with the driver blade 40. More specifically, the first latching assembly 60 includes a latching plate 240 which is pivotally mounted within the slot 218 by a pin 244. To provide a cooperating latching element carried on the nailer housing 22, a lever 246 is provided which is pivotally mounted within a slot 248 formed in the handle portion 22b by a pivot pin 250. The forward end of the lever 246 is provided with a pair of projecting lugs 246a which are adapted to be manually engaged when the first latching assembly 60 is to be released. The other end of the lever 246 is biased downwardly by a compression spring 252 which is disposed within a recess 254 in the handle portion 22b so that a projecting portion 246b which extends through an opening 256 in the cover plate 62 is disposed in alignment with the upper edge of the latching plate 240.

When the magazine assembly 24 is displaced rearwardly or to the right (Fig. 3) to the closed position, the lower surface of the latching portion 246b rides over the inclined upper surface of the latching plate 240 until it moves beyond the forward edge of the plate 240. The compression spring 252 then biases the projecting portion 246b downwardly into interlocking engagement with the upper edge of the plate 240. In order to insure that the latching assembly 60 holds the magazine housing 58 in a position on the cover plate 62 in which the drive track 50 is aligned with the driver blade 40, means are provided for adjusting the relative position of the latching plate 240. This adjusting means comprises a set screw 258 which is threadedly mounted on the bottom wall of the magazine housing 58 to bear against the lower edge of the latching plate 240. The set screw 258 is adjusted to pivot the upper edge of the plate forwardly or rearwardly until the projecting portion 246b and the upper edge of the latching plate 240 move into locking engagement when the drive track 50 is aligned with the driver blade 40. Thereafter, a set screw 260 which is threadedly received within the housing 58 on opposite sides of the slot 218 is tightened so that the plate 240 is clamped in its adjusted position. Thus, the locking screw 260 and the set screw 258 prevent displacement of the latching plate 240 during the use of the nailer 20. When the latching assembly 60 is to be released, downward pressure is applied to the tabs 246a to pivot the lever 246 in a counterclockwise direction (Fig. 3) so as to move the projecting portion 246b out of interlocking engagement with the upper extremity of the latching plate 240. This permits the magazine assembly 24 to be moved to the open position illustrated in Fig. 2.

The magazine assembly 24 also includes means which are operable upon movement of the magazine assembly 24 from the closed position to the open position for automatically retracting the follower 220, this means also serving to prevent inadvertent removal of the magazine assembly 24 from the nailer housing 22. As illustrated in Fig. 5, a set screw 262 is threadedly mounted on the build up block 114 so that the cylindrical head thereof is adapted to be received within an opening 264 formed within the cover plate 62. The magazine housing 58 is provided with an opening 266 through which an instrument, such as an Allen wrench, for adjusting the position of the set screw 262 can be inserted. When the set screw 262 is adjusted to the position illustrated in Fig. 5 and the magazine assembly 24 is moved forwardly relative to the head portion 22a of the nailer housing 22, the lower end of the head of the set screw 262 engages the projecting lug 220c on the follower 220 so that the follower is moved rearwardly in the slot 218. Thus, the movement of the magazine assembly 24 to the open position illustrated in Fig. 2 serves to automatically retract the follower 220 so that the strip 56 of nails can easily be placed in the slot 218. When the rear edge of the follower 220 engages the plate 240 at the end of the slot 218, further forward movement of the magazine housing 58 relative to the cover plate 62 is prevented and thus the inadvertent removal of the magazine assembly 24 is prevented. However, when the magazine assembly 24 is to be removed from the nailer 20, the set screw 262 is advanced upwardly so that the head thereof is entirely disposed within the opening 264 formed in the cover plate 62. Thus, when the magazine housing 58 is moved forwardly relative to the head portion 22a of the nailer housing 22, the follower 220 is not retracted and the cover plate 62 can be completely withdrawn from the grooves 236 and 238 to permit the complete removal of the magazine assembly 24.

The second latching assembly 64 (Fig. 6) is provided for latching the magazine assembly 24 in its open position (Fig. 2). The second latching assembly 64 includes a latching pin 268 (Figs. 4 and 6) which is slidably mounted within a sleeve 270 fitted into the upper end of an opening 272 formed in the magazine housing 58. The latching pin 268 is provided with a flange 268a between which and the lower end of the opening 272 is disposed a compression spring 274 which serves to urge the latching pin 268 upwardly into engagement with the lower surface of the plate 62. When the magazine housing 58 is moved forwardly on the supporting or cover plate 62, the rounded upper end of the pin 268 rides over the lower surface of this plate until it is moved into alignment with an opening 276 formed in an insert 278 carried on the plate 62. When the opening 276 is aligned with the pin 268, the compression spring 274 biases the pin 268 upwardly until the upper surface of the flange 268a engages the lower end of the sleeve 270, in which position the upper extremity of the latching pin 268 is received within the opening 276 to prevent relative movement between the magazine housing 58 and the cover plate 62.

In order to release the second latching assembly 64, a release button 280 is provided having a reduced diameter lower portion 280a which is received within the opening 276. The release button 280 is slidably mounted in an opening 282 in the build up block 114 and includes a flanged portion 280b which serves as a stop to limit movement of the release button 280 relative to the cover plate 62 and the build up block 114. The reduced diameter portion 280a of the pin 280 normally extends downwardly through the opening 276 in the insert 278. However, when the pin 268 is biased upwardly into the opening 276, the lower end of the release button 280 is engaged and this element is elevated to the position illustrated in Fig. 6. When the second latching assembly 64 is to be released, the release button 280 is manually depressed so that the lower end 280a thereof moves the upper end of the latching pin 268 out of the opening 276 and the magazine housing 58 is then moved rearwardly toward its closed position so that the upper end of the latching pin 268 is biased into engagement with the lower surface of the cover plate 62. The magazine assembly 24 can then be restored to its normal or closed position in which it is held by the first latching assembly 60.

To prepare the pneumatic nailer 20 for operation, the magazine assembly 24 is released for movement to its open position by actuating the first latching assembly 60 so that the projecting portion 246b moves up out of locking engagement with the upper edge of the latching plate 240. Thereafter, the magazine housing 58 is moved forwardly on the cover plate 62 to the open position illustrated in Fig. 2 in which the latching pin 268, after riding along the lower surface of the cover plate 62, suddenly snaps up into the opening 276. During this movement, the head of the set screw 262 engages the flange or lug 220c on the follower element 220 to retract the follower 220 in the slot 218. Accordingly, with the magazine assembly 24 latched in the open position illustrated in Fig. 2, a nail strip 56 can be inserted into the slot 218. After this, the release button 280 is depressed to move the upper end of the latching pin 268 out of the opening 276 and thereafter the magazine housing 58 is moved rearwardly to its normal closed position (Fig. 1). In moving to this position, the projection 246b on the latching lever 246 cams against the inclined edge of the latching plate 240 against the action of the compression spring 252 until such time as the end of the projection 246b moves into interlocking engagement with the upper edge of the latching plate 240. At this time, the compression spring 252 moves the projection 246b into interlocking engagement with the upper end of the latching plate 240. If the drive track 50 in the nosepiece assembly 42 is not aligned with the driver blade 40, the locking screw 260 is released and the set screw 258 is adjusted until the magazine housing 58 has been moved relative to the cover plate 62 to a position in which the drive track 50 is aligned with the driver blade 40. At this time, the locking screw 260 is tightened to clamp the latching plate 240 in its correct position.

The pneumatic nailer 20 is now in condition for operation. If the nailer 20 is to be operated under the control of the control valve assembly 46, the nosepiece assembly 42 is placed on a workpiece so that the yoke element 116 and 120 are elevated to lift the valve stem 108 against the action of the compressed air and the compression spring 112 to the position illustrated in Fig. 8. In moving to this position, the upper end 108b of the valve stem 108 closes off communication between the cavity 28 and the passageway 90 so that compressed air is no longer supplied to the cylindrical portions 70 and 86 through this system of passageways. However, concurrently with the closing off of this system of passageways, the annular recess 124 moves into communication with both the passageway 90 and the passageway 130 so that compressed air from the cavity 28 is supplied through the passageway 126, the bore 128, and the passageways 130 and 90 to maintain the cylinder 36 in the normal position illustrated in Fig. 3. When the tacker 20 is then to be operated, the trigger element 142 is pivoted in a counterclockwise direction to elevate the valve stem 138 and thus to move the ball valve 146 out of seating engagement with the O-ring 148 and into engagement with the edges of the passageway 126. This interrupts the flow of compressed air to the cylindrical portions 70 and 86 and exhausts the compressed air from these portions through the passageway 90, the annular recess 124, the passageway 130, the bore 128, and the slots 140 formed in the valve stem 138.

Exhausting the compressed air from the cylindrical portions 70 and 86 produces a pressure differential across the piston 72 so that the cylinder 36 moves downwardly to close off the passageway 209 and to move the annular recess 176 into alignment with the openings 178 to provide a system of exhaust passageways for the lower portion of the interior of this cylinder. In moving downwardly, the upper annular edge of the cylinder 36 pulls away from the outer edge of the flexible element 74 in the main valve element 48 so that compressed air is suddenly admitted through a large area opening into the upper interior of the cylinder 36. This compressed air produces an upwardly directed force differential across the main valve element 48 so that the supporting member 80 is moved rapidly upward to seat the bossed portion 154a of the exhaust valve element 154 against the resilient element 162, thereby closing off the passageway 150 to prevent the compressed air in the chamber 26 from being exhausted to the atmosphere. The compressed air admitted to the upper portion of the cylinder 36 also drives the piston 38 rapidly downward within the cylinder 36 so that the driver blade 40 engages the nail 34 provided in the drive track 50 and drives this nail outwardly through the drive track 50 into a workpiece.

During this downward movement of the blade 40, the side edges 40a and 40b thereof displace the pin 198 to the right so that the piston return valve assembly 54 is opened by moving the valve head 190b out of engagement with the edges of the bore 184. This permits compressed air from the cavity 28 to flow through the passageways 192 and 194, the counterbore 186, the bore 184, and the passageways 205 and 207 to the passageway 209. However, as described above, the passageway 209 is closed by the lower edge of the cylinder 36 and, accordingly, the compressed air is not admitted to the lower portion of the cylinder 36 at this time.

If the operation of the pneumatic nailer 20 is being controlled by the control valve assembly 46, the release of the trigger element 142 permits the compressed air acting on the ball valve 146 to move the valve stem 138 downwardly and to seat the ball valve 146 on the O-ring 148. Seating the ball valve 146 on the O-ring 148 closes off the system of passageways for exhausting the cylindrical portions 70 and 86 and this downward movement of the ball valve 146 further opens the passageway 126 to admit compressed air to these cylindrical portions. The compressed air admitted to the cylindrical portions 70 and 86 produces an upwardly directed force differential across the piston 72 so that the cylinder 36 moves upwardly until the upper edge thereof engages the main valve element assembly 48. Upon engagement, the main valve element assembly 48 and the cylinder 36 move to the position illustrated in Fig. 11 during which the exhaust valve assembly 52 is momentarily actuated to an open position by unseating the O-ring 158 from the inwardly projecting flange 80b, thus bleeding a small portion of the air entrapped in the upper portion of the cylinder to the atmosphere through the passageway 150. This reduction in the pressure of the compressed air within the cylinder 36 produces a pressure differential across the main valve element 48 which is downwardly directed so that the engaged element 48 and cylinder 36 move to the normal position illustrated in Fig. 3. In this position, the boss 154a on the exhaust valve element 150 is moved out of seating engagement with the resilient element 162 and, accordingly, the exhaust valve assembly 52 is opened to exhaust the compressed air contained in the cylinder 36 above the piston 38.

When the cylinder 36 is moved upwardly into engagement with the main valve element 48, the annular recess 176 is moved out of alignment with the openings 178 to close off the exhaust passageways for the lower portion of the cylinder 36. Concurrently therewith, the lower end of the cylinder 36 moves above the passageway 209 to permit the compressed air supplied under the control of the piston return valve assembly 54 to be supplied to the lower portion of the cylinder 36. Thus, when the compressed air above the piston 38 is exhausted to the atmosphere, the compressed air supplied by the valve assembly 54 rapidly elevates the piston 38 to the position illustrated in Fig. 3 in which the upper end of this piston engages the lower plate 78 of the main valve element 48. Concurrently with this upward movement of the piston 38, the driver blade 40 is retracted so that the follower pin 198 is displaced to the left by the compressed air acting on the valve head 190b of the valve stem 190. This compressed air in returning the piston return valve assembly 54 to its normal condition seats the valve head 190b on the valve body 180 to close off communication between the counterbore 186 and the bore 184, thereby preventing the further admission of compressed air to the cylinder 36. This terminates a cycle of operation of the pneumatic nailer 20.

If the nailer 20 is moved along the workpiece without lifting the nosepiece assembly 42 from engagement with the workpiece so that the safety valve arrangement 44 remains in the operated condition illustrated in Figs. 8 and 9, repeated operation of the control valve assembly 46 results in repeated operation of the nailer 20 to drive a series of nails into the workpiece. However, if it is desired to automatically operate the nailer 20 in response to placing the nosepiece assembly 42 against a workpiece, the control valve 46 is held in an operated condition by the continuous application of pressure to the trigger piece 142 and the nailer 20 is periodically moved into engagement with the workpiece so that the operating yokes 116 and 120 periodically actuate the safety valve assembly 44 to its operated position. With the control valve assembly 46 held in an operated condition, each time the safety valve assembly 44 is actuated by placing the nosepiece 42 on a workpiece, the nailer 20 is operated to drive a nail. Thus, the nailer 20 can be actuated automatically by merely moving the nosepiece thereof into intermittent engagement with a workpiece and without requiring the repeated operation of the manually controlled valve assembly 46.

In summary, the pneumatically operated nailer of the present invention provides means for driving large fasteners, such as the nails, into a workpiece and is of a sufficiently rugged construction to withstand the forces of shock and vibration incurred in driving these large fasteners. This nailer also develops the large forces necessary to drive nails with an economical use of compressed air by virtue of an improved exhaust valve arrangement.

Nails are sequentially supplied to this nailer for driving by a new and improved magazine construction which is slidably mounted on the nailer housing for movement between an open position in which nail strips can be inserted into the magazine and a closed position in which a drive track defined by structure on the movable magazine is aligned with a driver blade enclosed by the nailer housing.

Although the present invention has been described in conjunction with a single embodiment thereof it should be understood that numerous other modifications and embodiments may be provided by those skilled in the art which will fall within the spirit and scope of the principles of the present invention.

What is claimed as new and desired to be secured by Letters Patent of the United States is:

1. A fastener driving apparatus comprising a first housing, fastener driving means including a fastener driving element carried on said first housing and movable between a normal position enclosed by said housing and a displaced position projecting outwardly from said first housing, a second housing including structure defining a drive track for slidably receiving said element in said displaced position, means in said second housing for feeding fasteners into said drive track for engagement by said element, means connecting said first and second housings for movement relative to each other, said first and second housings being movable to a position in which said drive track is aligned with said element, means for operating said fastener driving means so that said element enters said drive track to engage and drive a fastener, and control means for preventing operation of said operating means when said drive track is not aligned with said element.

2. The fastener driving apparatus set forth in claim 1 in which said control means includes an operating linkage, one part of which is carried on said first housing and another part of which is carried on said second housing so that said parts of said linkage are moved out of an operative relationship whenever said drive track is not aligned with said element.

3. A fastener driving apparatus comprising fastener driving means including a reciprocable driver element, structure defining a drive track for slidably receiving said driver element, means movably supporting said structure to permit said drive track to be shifted into and out of alignment with said driver element, means for operating said fastener driving means to reciprocate said driver element, and control means for preventing operation of said operating means unless said drive track is aligned with said driver element.

4. The fastener driving apparatus set forth in claim 3 in which said operating means includes a valve and in which said control means includes valve actuating means shiftable with said structure between a first position in which it is effective to control said valve when said drive track and driver element are aligned and a second position in which it is ineffective to control said valve when said drive track and said driver element are not aligned.

5. An apparatus for driving strips of fasteners comprising a first housing, pneumatically actuated fastener driving means mounted in said first housing, a magazine cover plate secured to said first housing, a fastener magazine housing, supporting means in said magazine housing for supporting a strip of fasteners, follower means for advancing said strip of fasteners toward a driving position, and structure on said magazine housing for slidably receiving said cover plate so that said first housing and said cover plate can be moved relative to said magazine housing to opposite displaced positions in one of which said cover plate overlies said supporting means and said follower means and in the other of which said cover plate is spaced from said supporting means and said follower means.

6. A fastener driving apparatus comprising a first housing having an enlarged head portion, fastener driving means mounted in said head portion, a magazine cover plate secured to said housing and extending rearwardly from said head portion, a magazine housing partially enclosing fastener feeding means for feeding fasteners toward said head portion for driving by said fastener driving means, and means slidably mounting said magazine housing on said cover plate for sliding movement of said magazine housing from a closed position in which said cover plate overlies said magazine housing to complete the enclosure of said feeding means forwardly relative to said head portion to an open position in which said feeding means are only partially enclosed, said cover plate providing the sole means for supporting said magazine housing on said first housing.

7. An apparatus for driving fasteners from a strip thereof comprising a first housing having an enlarged head portion and a rearwardly extending handle portion, pneumatically actuated fastener driving means mounted in said head portion, a magazine cover plate connected to said head portion and said handle portion, a magazine housing defining a cavity with an open upper end, supporting means in said cavity in said magazine housing for slidably supporting a strip of fasteners, follower means in said cavity for advancing said strip of fasteners forwardly toward a driving position adjacent said head portion, said magazine housing normally being disposed adjacent said first housing with said cover plate overlying said follower means and said supporting means and closing said open upper end of said cavity, and means mounting said magazine housing on said cover plate for forward sliding movement of said magazine housing relative to said head portion so that said magazine housing can be moved to an open position away from said cover plate to expose said supporting means.

8. A fastener driving apparatus for use with strips of fasteners comprising a first housing having an enlarged head portion and a magazine cover plate extending rearwardly from said head portion, fastener driving means mounted in said head portion and including a reciprocable driver blade, a magazine housing including structure forming a drive track for removably receiving said driver blade, fastener strip supporting means mounted in said magazine housing, follower means for biasing a fastener strip on said supporting means toward said drive track, said magazine housing normally being disposed in a closed position adjacent said first housing with said drive track aligned with said driver blade and with said cover plate overlying said fastener strip supporting means, means slidably mounting said magazine housing on said first housing for movement relative to said head portion from said closed position to an open position in which said drive track is spaced from said head portion and in which said cover plate does not overlie said magazine housing, latch means for holding said magazine housing in said closed position, and means for adjusting said latch means to move said drive track into alignment with said driver blade.

9. A fastener driving apparatus using strips of fasteners comprising a first housing, fastener driving means mounted on said first housing, a magazine housing slidably mounted on said first housing, a pair of parallel and spaced rails disposed in said magazine housing for supporting a strip of fasteners, a first latch element carried on said first housing, a second latch element disposed between said rails in alignment with said first latch element, said first and second latch members being movable into engagement to hold said magazine housing in a selected position on said first housing, and means for adjusting the position of said second latch element.

10. An apparatus for driving fasteners into a workpiece comprising a cylinder, a piston slidably mounted in said cylinder, structure defining a drive track adapted to receive fastener to be driven, a driver blade slidable in said drive track and actuated by said piston to drive said fastener, first control means adapted to be manually actuated when a fastener is to be driven into a workpiece, second control means operated by disposing said structure adjacent said workpiece, and means controlled by concurrent operation of said first and second control means for supplying a compressed fluid medium to said cylinder to operate said piston.

11. In combination with an apparatus using a piston and cylinder actuated blade for driving fasteners into a workpiece, a safety arrangement comprising a pair of valves, manually actuated means for controlling one of said valves, means actuated by movement of said apparatus into engagement with said workpiece for controlling the other of said valves, and means controlled by the operation of both of said valves for admitting compressed air into said cylinder so that said blade is actuated to drive a fastener into said workpiece.

12. In combination with an apparatus using a piston and cylinder actuated blade for driving fasteners into a workpiece, a safety arrangement comprising a pair of valves, trigger controlled means for operating a first one of said valves, a movably mounted operator linkage adapted to engage said workpiece for operating a second one of said valves when said apparatus is disposed immediately adjacent said workpiece, and means controlled by the concurrent operation of said first and second valves for admitting compressed air into said cylinder to actuate said piston so that a fastener is driven by said blade.

13. An apparatus for driving fasteners into a workpiece comprising a housing including a cylinder, a piston slidably mounted in said cylinder, a nosepiece on said housing defining a drive track for receiving fasteners to be driven, a fastener driving element actuated by said piston and slidably movable in said drive track, a first manually operated valve, a second valve, an operator element movably mounted on said housing to project beyond said nosepiece, said operator element being adapted to operate said second valve when said nosepiece is placed adjacent said workpiece, and means controlled by said first and second valves for admitting compressed air into said cylinder to operate said fastener driving element.

14. An apparatus for driving fasteners into a workpiece comprising a housing including a cylinder, a piston slidably mounted in said cylinder, a nosepiece on said housing defining a drive track adapted to receive fasteners to be driven, a fastener driving element actuated by said piston and slidable in said drive track to advance a fastener through said drive track and out of one end of said nosepiece, a first valve, trigger means for opening said first valve, a second valve, a first operator means carried on said housing and normally biasing said second valve to a closed condition, a second operator means movable mounted adjacent said nosepiece in juxtaposition to said first operator means and adapted to engage said workpiece, engagement of said workpiece by said second operator means serving to actuate said first operator means to open said second valve, and means controlled by the opening of said first and second valves for admitting compressed air to said cylinder to actuate said fastener driving element.

15. The apparatus set forth in claim 14 including means for movably mounting said nosepiece on said housing and in which relative movement of said housing and said nosepiece to a position in which said drive track is not aligned with said fastener driving element moves said first and second operator means out of juxtaposition to prevent operation of said apparatus.

16. In an apparatus having a shiftable cylinder containing a pneumatically operated piston for actuating a fastener driving blade, the combination comprising first valve means having a normal position for supplying compressed air for holding said cylinder in a closed position to prevent the admission of compressed air into said cylinder, second valve means, means for operating said first valve means to a displaced position in which said first valve means and said second valve means supply compressed air for holding said cylinder in said closed position, means for operating said second valve means to a displaced position, and a fluid passageway controlled by said first and second valve means in their displaced positions for discontinuing the supply of compressed air for holding said cylinder in said closed position so that said cylinder shifts to an open position to admit compressed air into said cylinder for operating said fastener driving blade.

17. A fastener driving apparatus comprising a housing; a cylinder slidably mounted in said housing; means including a piston slidably mounted in said cylinder for driving fasteners; means for shifting said cylinder from a normal position to an open position to admit compressed air into said cylinder for actuating said piston and for then returning said cylinder to said normal position; controllable means for exhausting air from said cylinder; and means controlled by said shifting of said cylinder for closing said controllable means when said cylinder is shifted to said open position and for momentarily opening said controllable means when said cylinder is returned to said normal position.

18. A fastener driving apparatus comprising a housing defining a chamber supplied with a compressed medium, a cylinder movably mounted in said chamber, a valve element movably mounted on the housing and engaging said cylinder to close off communication with the interior of said cylinder, a piston slidably mounted in said cylinder, means for moving said valve element and said cylinder away from each other to admit a compressed medium into the interior of said cylinder to displace said piston, means for moving said cylinder into engagement with said valve element, and an exhaust valve momentarily opened in response to the engagement of said valve element by said cylinder for venting the interior of said cylinder so that the compressed air in said chamber forces said valve element into engagement with said cylinder.

19. A fastener driving apparatus comprising a housing defining a chamber supplied with compressed air, a cylinder in said chamber and having an open end, fastener driving means including a piston slidably mounted in said cylinder, a valve element in said chamber normally engaging and closing the open end of said cylinder, means for selectively shifting said valve element to a first displaced position in which the open end of said cylinder is placed in communication with said chamber to admit compressed air for driving said piston and to a second displaced position in which said valve element is engaged by said cylinder, an exhaust valve for venting said cylinder, and means controlled by movement of said valve element toward first displaced position for closing said exhaust valve and to said second displaced position for momentarily opening said exhaust valve.

20. A fastener driving apparatus comprising a housing; a cylinder slidably mounted in said housing; means including a piston slidably mounted in said cylinder for driving fasteners; means for shifting said cylinder from a normal position to an open position to admit compressed air into said cylinder for actuating said piston, for then shifting said cylinder to a closed position in which the flow of air into said cylinder is terminated, and for then returning said cylinder to said normal position; an exhaust valve assembly for exhausting air from said cylinder; and means controlled by said shifting of said cylinder for closing said exhaust valve assembly when said cylinder is shifted to said open position, for momentarily opening said exhaust valve assembly when said cylinder is shifted to said closed position, and for opening said exhaust valve assembly when said cylinder is shifted to said normal position.

21. In a fastener driving apparatus including a housing defining a cavity supplied with compressed air, a cylinder slidably mounted in said cavity and having an open end, fastener driving means including a piston slidably mounted in said cylinder, and means for shifting said cylinder from a normal position to an open position in which the open end is in communication with the cavity and for then shifting said cylinder to a closed position in which the open end is closed, the combination comprising a valve element engaging said cylinder to close the open end thereof in said normal position, means movably supporting said valve element on said housing so that said valve element is moved to a displaced position out of engagement with said cylinder when said cylinder is shifted to said open position, the shifting of said cylinder to said closed position moving the open end of said cylinder into engagement with said valve element in said displaced position, and an exhaust valve assembly controlled by said valve element to close said assembly when said valve element is moved to said displaced position and to momentarily open said assembly when said cylinder moves into engagement with said valve element in said displaced position.

22. A piston driving apparatus comprising a housing defining a chamber supplied with compressed air, a cylinder in said chamber and having an open end, a piston in said chamber, a valve element engaging said cylinder to close the open end thereof, a supporting member secured to said valve element and slidably mounted on said housing, means for shifting said valve element and said supporting means relative to said housing and said cylinder to selectively admit compressed air from said chamber into said cylinder to drive said piston, said supporting member having a passageway passing therethrough for venting said cylinder and a shouldered portion, a valve seat carried on said housing in alignment with and normally spaced from said supporting means, an apertured valve member disposed in said passageway, and means for biasing said valve member into engagement with said shouldered portion of said supporting member, the shifting of said valve element and said supporting member to one position moving said apertured valve member into engagement with said valve seat to close off said passageway and the shifting of said valve element and said supporting member to another position moving said valve member out of engagement with said supporting member to momentarily open said passageway.

23. A fastener driving apparatus comprising a housing defining a chamber supplied with a compressed medium, a cylinder movably mounted in said chamber, a piston movably mounted in said cylinder, said cylinder and said housing having structure defining a first valve means, means for shifting said cylinder between a normal position and a displaced position to selectively admit said compressed air into said cylinder for displacing said piston, movement of said cylinder to said displaced position closing said first valve means and movement of said cylinder toward said normal position opening said first valve means, second valve means controlled by movement of said piston and operated to an open condition by displacement of said piston, and means including said first and second valve means for supplying a compressed medium to said cylinder when said first and second valve means are opened for returning said piston from its displaced position.

24. A fastener driving apparatus comprising a housing defining a chamber supplied with compressed air, a cylinder movably mounted in said chamber, a piston slidably mounted in said cylinder, a fastener driving blade actuated by said piston, said cylinder and said housing including structure forming a first valve means, means for selectively shifting said cylinder between a normal position and a displaced position to admit compressed air from said chamber into said cylinder to actuate said piston through a driving stroke from a normal position to a displaced position, movement of said cylinder toward a displaced position closing said first valve means and movement of said cylinder toward said normal position opening said first valve means, second valve means operable to supply compressed air to said first valve means, and means actuated by said fastener driving blade for opening said second valve means in response to movement of said piston toward said displaced position so that compressed air is supplied to said cylinder to return said piston to its normal position following each driving stroke of said piston and when said cylinder moves from its displaced position toward its normal position.

25. A fastener driving apparatus comprising a housing defining a chamber supplied with compressed air, a cylinder movably mounted in said chamber and having an open end, a valve element carried on said housing and normally closing the open end of said cylinder, a piston slidably mounted in said cylinder, a piston bumper freely disposed in said cylinder spaced from the open end thereof, means for moving said cylinder toward and away from said valve element to selectively admit compressed air from said chamber into the open end of said cylinder for displacing said piston, and resilient means interposed between said piston bumper and said cylinder for retaining said bumper and for biasing said cylinder toward said valve element.

26. The fastener driving apparatus set forth in claim 25 in which said cylinder includes inwardly projecting means and in which said resilient means comprises a cylindrical spring which encircles said bumper and which is disposed within said cylinder to engage said projecting means.

27. In a fastener driving device, a housing including an enlarged head portion defining a piston receiving cavity with an open end, said housing having a threaded portion adjacent said open end, a closure cap threadedly mounted on said threaded portion of said housing to close said open end, an annular resilient element disposed between said housing and said cap adjacent said threaded portion, and means for supplying compressed air to said cavity to bias said resilient element into gripping engagement with said housing and said cap, thereby to prevent the removal of said cap.

28. A fastener driving apparatus comprising a first housing, fastener driving means enclosed in said first housing and including a reciprocably movable drive element, a second housing, fastener feeding means carried solely on said second housing for supplying fasteners to be driven by said movable drive element, interlocking structures on said first and second housings for connecting said first and second housings for unlimited sliding movement relative to each other so that said second housing and the fastener feeding means carried thereon can be completely disassembled from said first housing and the fastener driving means carried thereon, and stop means carried on said first and second housings for normally limiting relative movement therebetween for preventing the separation of said first and second housings.

29. In a fastener driving tool, a housing defining both a chamber adapted to receive compressed air and an exhaust passageway, a cylinder movably mounted in said chamber and in communication with said passageway, a piston movably mounted in said cylinder, a valve means normally closing said passageway, a valve seat normally engaged by said cylinder to close off communication between the interior of the cylinder and said chamber, means for shifting said cylinder into and out of engagement with said valve seat to selectively admit air into said cylinder to operate said piston, and means adapted to engage said cylinder and responsive to movement of said cylinder toward said valve seat for opening said valve means.

30. In a fastener driving tool, a housing defining a chamber having an upper opening and adapted to receive compressed air, a cylinder movably mounted in said chamber, a piston movably mounted in said cylinder, a cap mounted on said housing to close said opening and including structure defining an exhaust passageway, valve means carried on said cap and normally closing said passageway, a valve seat normally engaged by said cylinder to close off communication between the interior of the cylinder and said chamber, means for shifting said cylinder into and out of engagement with said valve seat to selectively admit air into said cylinder to operate said piston, and means actuated by engagement with said cylinder during movement of said cylinder toward said valve seat for opening said valve means.

References Cited in the file of this patent

UNITED STATES PATENTS

| | | |
|---|---|---|
| 1,841,217 | Seizer | Jan. 12, 1932 |
| 2,501,362 | Temple | Mar. 21, 1950 |
| 2,729,198 | Faccou | Jan. 3, 1956 |
| 2,733,440 | Jenny | Feb. 7, 1956 |
| 2,756,426 | Campbell | July 31, 1956 |
| 2,801,414 | Mueller | Aug. 6, 1957 |